United States Patent [19]

Tokoi et al.

[11] Patent Number: 5,155,582
[45] Date of Patent: Oct. 13, 1992

[54] DOT CRAWLING INTERFERENCE ELIMINATION DEVICE AND COLOR SUBCARRIER VERTICAL CORRELATION DETECTION DEVICE

[75] Inventors: Masaki Tokoi, Neyagawa; Atsushi Ishizu, Takatsuki; Kiyoshi Imai, Ibaraki, all of Japan

[73] Assignee: Matsushita Electric Industrial Co. Ltd., Osaka, Japan

[21] Appl. No.: 559,066

[22] Filed: Jul. 30, 1990

[30] Foreign Application Priority Data

Aug. 4, 1989 [JP] Japan ................... 1-203265

[51] Int. Cl.⁵ .............................................. H04N 9/78
[52] U.S. Cl. ........................................................ 358/31
[58] Field of Search ........................... 358/31, 17, 11

[56] References Cited

U.S. PATENT DOCUMENTS

| | | | |
|---|---|---|---|
| 4,072,984 | 2/1978 | Kaiser | 358/31 |
| 4,509,072 | 4/1985 | Elmis et al. | 358/17 |
| 4,635,099 | 1/1987 | Nicholson et al. | 358/17 |
| 4,635,104 | 1/1987 | Hausdorfer | 358/31 |
| 4,777,522 | 10/1988 | Parish et al. | 358/19 |

FOREIGN PATENT DOCUMENTS

| | | |
|---|---|---|
| 221792 | 9/1988 | Japan . |
| 292794 | 11/1988 | Japan . |
| 135895 | 5/1990 | Japan . |
| 177689 | 7/1990 | Japan . |

Primary Examiner—John W. Shepperd

[57] ABSTRACT

A dot crawling interference elimination device and a color subcarrier vertical correlation detection device, which comprise a color subcarrier vertical correlation detection device for a video signal, an adaptive three-dimensional Y/C separation unit, and an adaptive notch filter of a color signal band, detect vertical correlation of a color subcarrier in a non-standard signal, such as a signal reproduced from a home VCRs or a special signal reproduced from an optical VDP system, that does not strictly meet the standards of the NTSC system or the PAL system, thereby to discriminate non-standard characteristics of the signal, and eliminate a color signal component, which mixes into a luminance signal when a motion-adaptive Y/C separation is carried out for the non-standard signal, by using an adaptive notch filter that suits a non-standard state of the input image signal.

7 Claims, 10 Drawing Sheets

FIG. 4-1          FIG. 4-2
INPUT SIGNAL 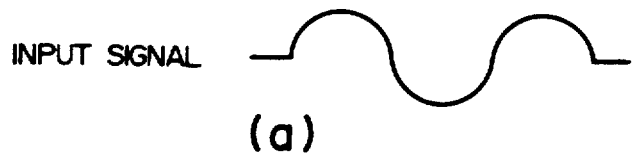 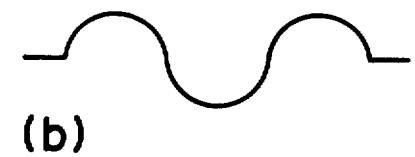
(a)               (b)
ONE FRAME DELAYED SIGNAL 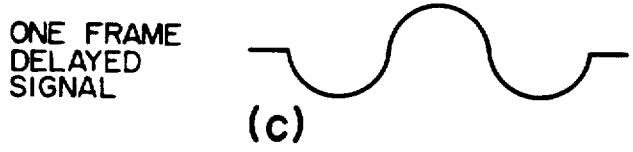 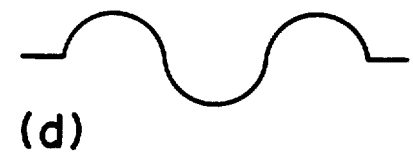
(c)               (d)
ADDED VALUE 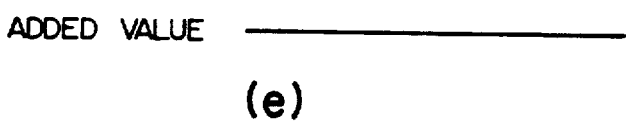 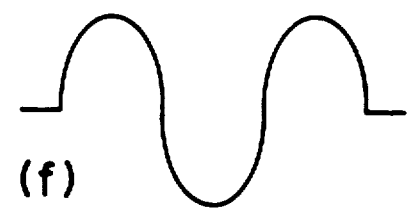
(e)               (f)
ABSOLUTE VALUE 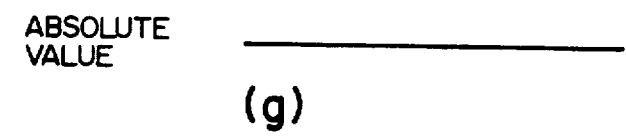 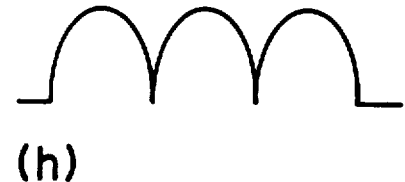
(g)               (h)
RIPPLE CORRECTED VALUE 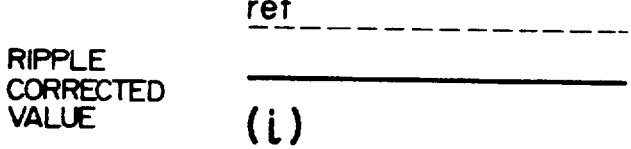 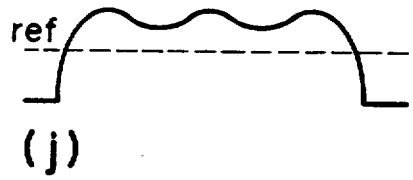
(i)               (j)
COMPARED VALUE 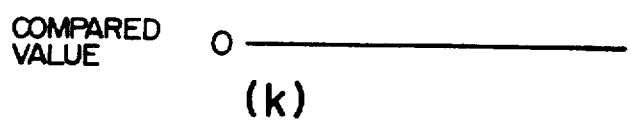 
(k)               (ℓ)

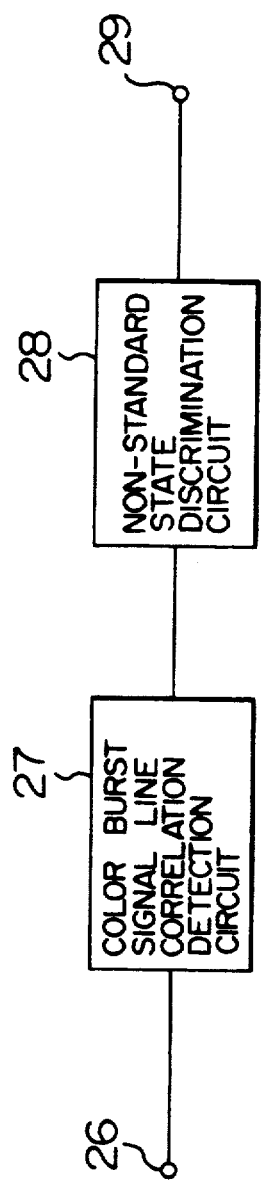
F I G. 5
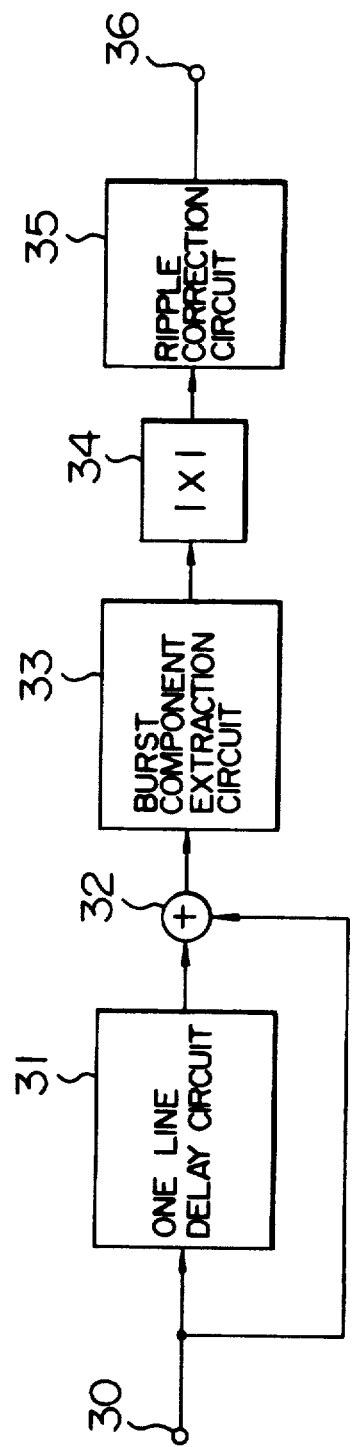
F I G. 6

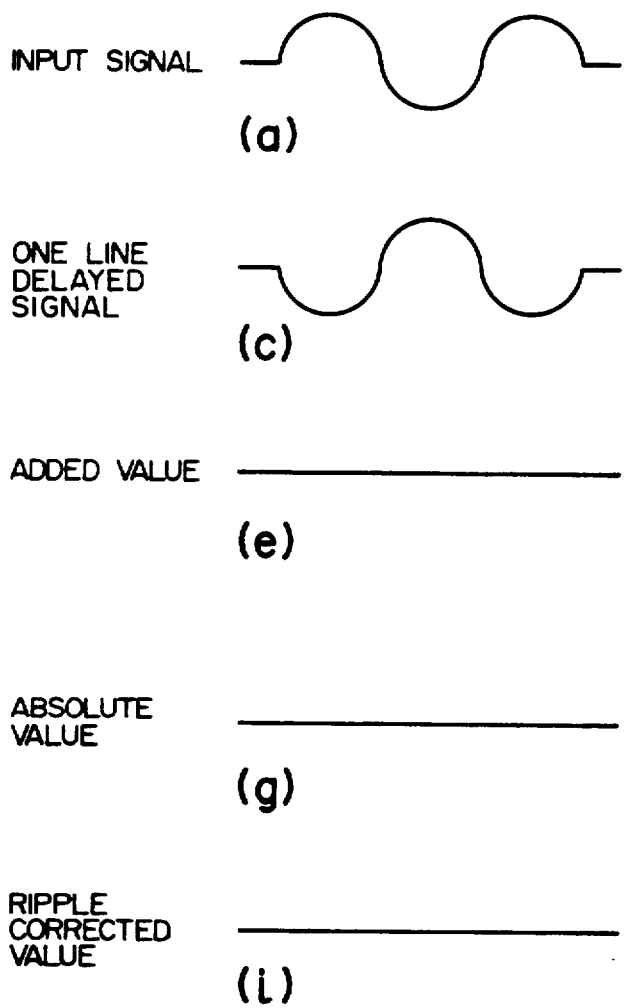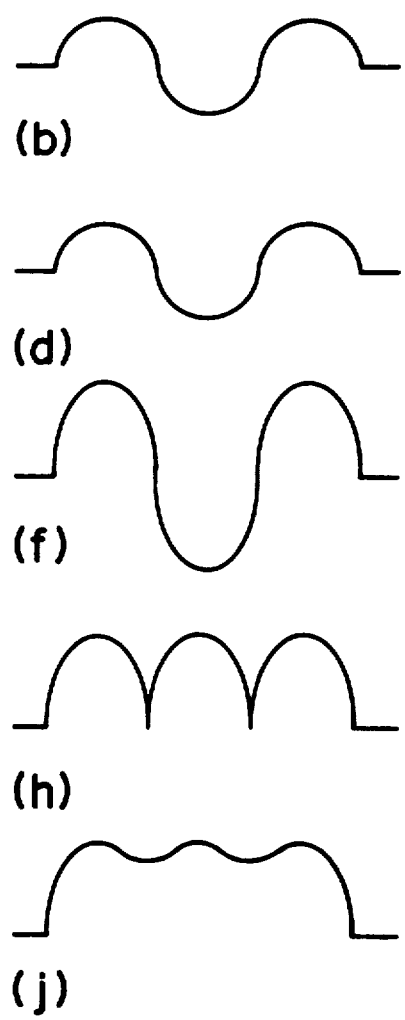
FIG. 7-1    FIG. 7-2

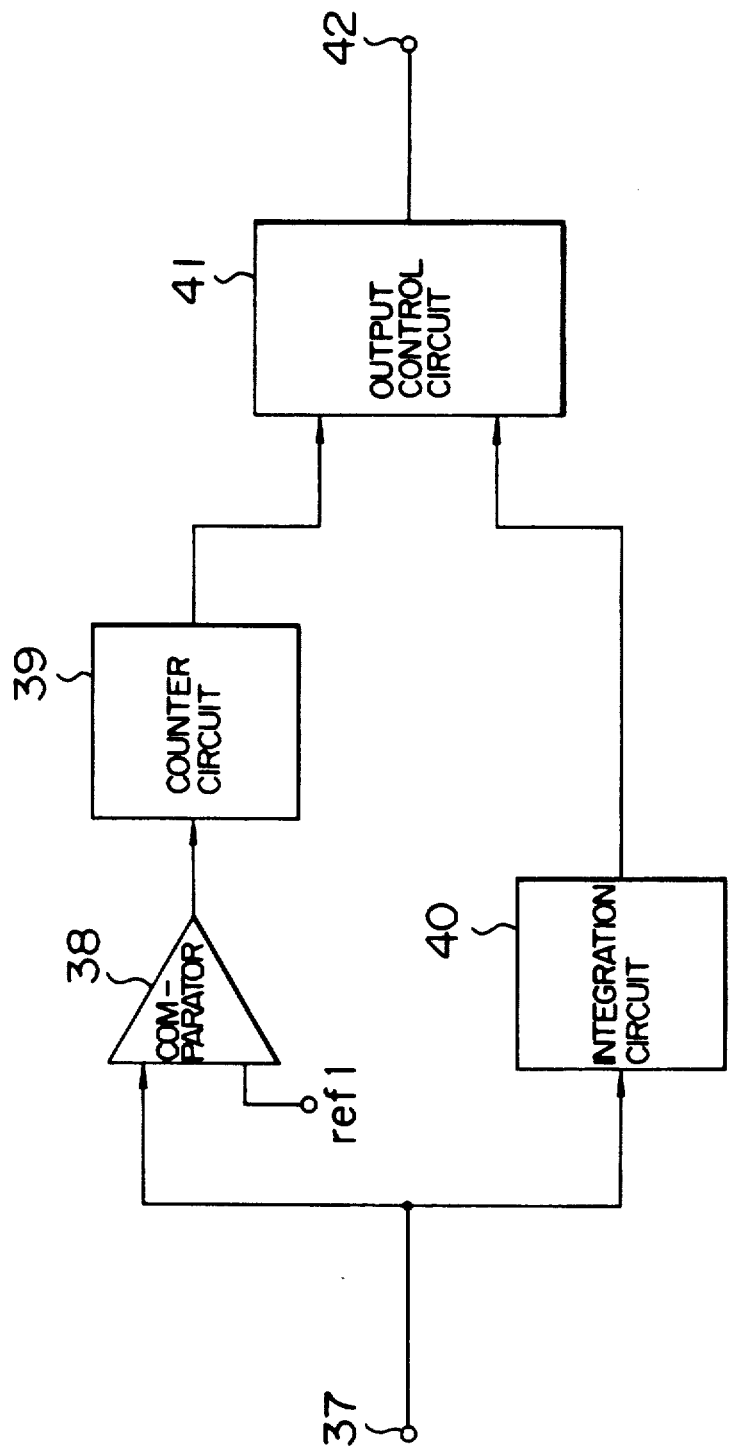
F I G. 8

DOT CRAWLING INTERFERENCE ELIMINATION DEVICE AND COLOR SUBCARRIER VERTICAL CORRELATION DETECTION DEVICE

BACKGROUND OF THE INVENTION

The present invention relates to a dot crawling interference elimination device and a color subcarrier vertical correlation detection device therefor which are used to eliminate a color signal that mixes into a luminance signal when a non-standard signal which does not meet the standards of the NTSC system or the PAL system is Y/C separated, in a television receiver having a motion-adaptive Y/C separation function.

There are various problems occurring in a television receiver, such as dot crawling interference and cross color interference which occur due to multiplexing of the frequency of a color signal with the frequency of a luminance signal, line flicker which occurs due to interlace scanning, and deterioration of picture quality which occurs due to reduction in vertical resolution, etc. In order to solve these problems, frame memories and digital signal processing techniques have been used in recent years, thereby to improve the quality of the picture in a television receiver. These methods introduce processing techniques such as a three dimensional Y/C separation which utilizes correlation of time directions of video signals and a sequential scanning converter.

Based on these high picture-quality processing techniques, it is a pre-condition that the input television signals are completely based on the NTSC system or the PAL system. In other words, the signals used for these systems have a predetermined relationship of frequencies including a color subcarrier frequency, a horizontal scanning frequency and a vertical scanning frequency (hereinafter referred to as a standard signal). For example, in carrying out a Y/C separation of a still image, if a color subcarrier frequency, a horizontal scanning frequency and a vertical scanning frequency are in a predetermined frequency relationship, a frame comb filter becomes valid which utilizes a correlation of time base direction of a video signal to separate a luminance signal from a color signal. However, if a frame comb filter is used for home VCRs or personal computers which does not have a predetermined relationship of a color subcarrier frequency, a horizontal scanning frequency and a vertical scanning frequency, a Y/C separation cannot be performed normally so that this causes a problem of deterioration in the picture quality.

In order to solve the above problem dot crawling interference elimination devices have been proposed, according to which a non-standard characteristic of an input video signal is detected by utilizing inter-frame correlation of a color burst signal, and a frame comb filter and a line comb filter are changed over therebetween in accordance with a result of the detection, and further, a notch filter for a color subcarrier signal band is applied to a luminance signal resulting from the Y/C separation.

Description will be made of a preceding dot crawling interference elimination device with reference to the accompanying drawings.

FIG. 11 is a block diagram of a preceding dot crawling interference elimination device. In FIG. 11, 101 designates an input terminal, 102 a non-standard signal detection circuit, 103 an image motion detection circuit, 104 a line comb filter, 105 a frame comb filter, 106 a line comb filter and frame comb filter change-over circuit, 107 an OR circuit, 108 a color subcarrier band pass filter, 109 a color subcarrier band notch filter, 110 a notch filter change-over circuit, 111 a subtractor, and 112 an output terminal.

Referring to FIG. 11, when a non-standard signal is detected by the detection circuit 102 or when a motion image is detected by the detection circuit 103, the change-over circuit 106 selects the line comb filter 104 so that a video signal which is applied to the input terminal 101 is Y/C separated by the line comb filter. When an input video signal is non-standard, the luminance signal component can not be completely separated from the video by the line comb filter. Therefore, the separated luminance signal containing the color subcarrier component attenuated by the notch filter 109 in the next step, is selected by the notch filter change-over circuit 110 and supplied to the output terminal 112.

The non-standard detection circuit 102 detects an inter-frame correlation of the color burst signal of the input video signal, and makes a decision whether the input signal is a non-standard signal or not, on the basis of a result of the detection.

According to the above-described arrangement, however, a non-standard state of an input video signal is judged based on only the inter-frame correlation of a color burst signal. Therefore, there is a problem of an incomplete or erroneous detection of the non-standard signal when the relation between the color subcarrier frequency and the vertical scanning frequency meets the relation in a standard signal, even if the color subcarrier frequency does not have a normal relation with the horizontal scanning frequency. As a result, there arises such a situation that a signal which should be Y/C separated by a line comb filter is separated by a frame comb filter. Further, there is a problem that a color signal component which has been mixed into a luminance signal component that is a result of such an erroneous Y/C separation processing, that is, a dot crawling component, does not subject to the processing attenuating the same by a post-stage notch filter, so that a dot crawling component remains in the luminance signal component.

SUMMARY OF THE INVENTION

In light of the above-described problems, it is an object of the present invention to provide a dot crawling interference elimination device and a color subcarrier vertical correlation detection device used therefor which can extract a satisfactory luminance signal component even if the relation between a color subcarrier wave does not satisfy the predetermined relationship of the frequencies exactly.

In order to achieve the above object, the dot crawling interference elimination device of the present invention comprises means for detecting a vertical correlation from the sum of inter-line color subcarrier of an input video signal, and a notch filter for eliminating dot crawling interference from a luminance signal resulting from a Y/C separation of the input signal, in accordance with an output of said detecting means.

Further, in order to achieve the above object, the color subcarrier vertical correlation detection device of the present invention comprises means for detecting vertical correlation of a color burst signal of an input video signal and means for discriminating a non-standard state of the input video signal on the basis of an output of said detecting.

With the above-described arrangement, in a television receiver having a motion-adaptive Y/C separation function, the dot crawling interference elimination device of the present invention detects a vertical correlation of a color subcarrier of a non-standard signal which does not satisfy the standard of the NTSC or PAL system such as a signal reproduced from a home VCRs or an optical VDP system, and applies a notch filter to a luminance signal resulting from a Y/C separation in accordance with a result of the detection, so that a satisfactory luminance signal having suppressed dot crawling interferences can be obtained.

Further, in order to detect a vertical correlation of a color subcarrier of an input video signal, the color subcarrier vertical correlation detection device of the present invention can judge a non-standard state of the relation between the color subcarrier frequency and the horizontal scanning frequency when the relation is non-standard, even if the relation between the color subcarrier frequency and the vertical scanning frequency is normal in the input video signal.

BRIEF DESCRIPTION OF THE DRAWINGS

FIG. 4 is a waveform diagram for explaining the operation of the non-standard signal detection circuit, in which FIG. 4-1 shows a standard state wherein the phase of a color subcarrier is inverted between frames, and FIG. 4-2 shows a nonstandard state wherein the phase of the color subcarrier is in phase between the frames;

FIG. 5 is a block diagram showing one embodiment of a color subcarrier vertical correlation detection device of the present invention;

FIG. 6 is a block diagram showing one example of the configuration of a color burst signal inter-line correlation detection circuit in FIG. 5;

FIG. 7 is a waveform diagram for explaining the operation of the color burst signal inter-line correlation detection circuit, in which FIG. 7-1 shows a standard state wherein the phase of a color subcarrier is inverted between lines, and FIG. 7-2 shows a non-standard state wherein the phase of the color subcarrier is in phase between lines;

FIG. 8, is a block diagram showing one example of the configuration of a non-standard state discrimination circuit in FIG. 5;

DESCRIPTION OF THE PREFERRED EMBODIMENTS

Figure 1:
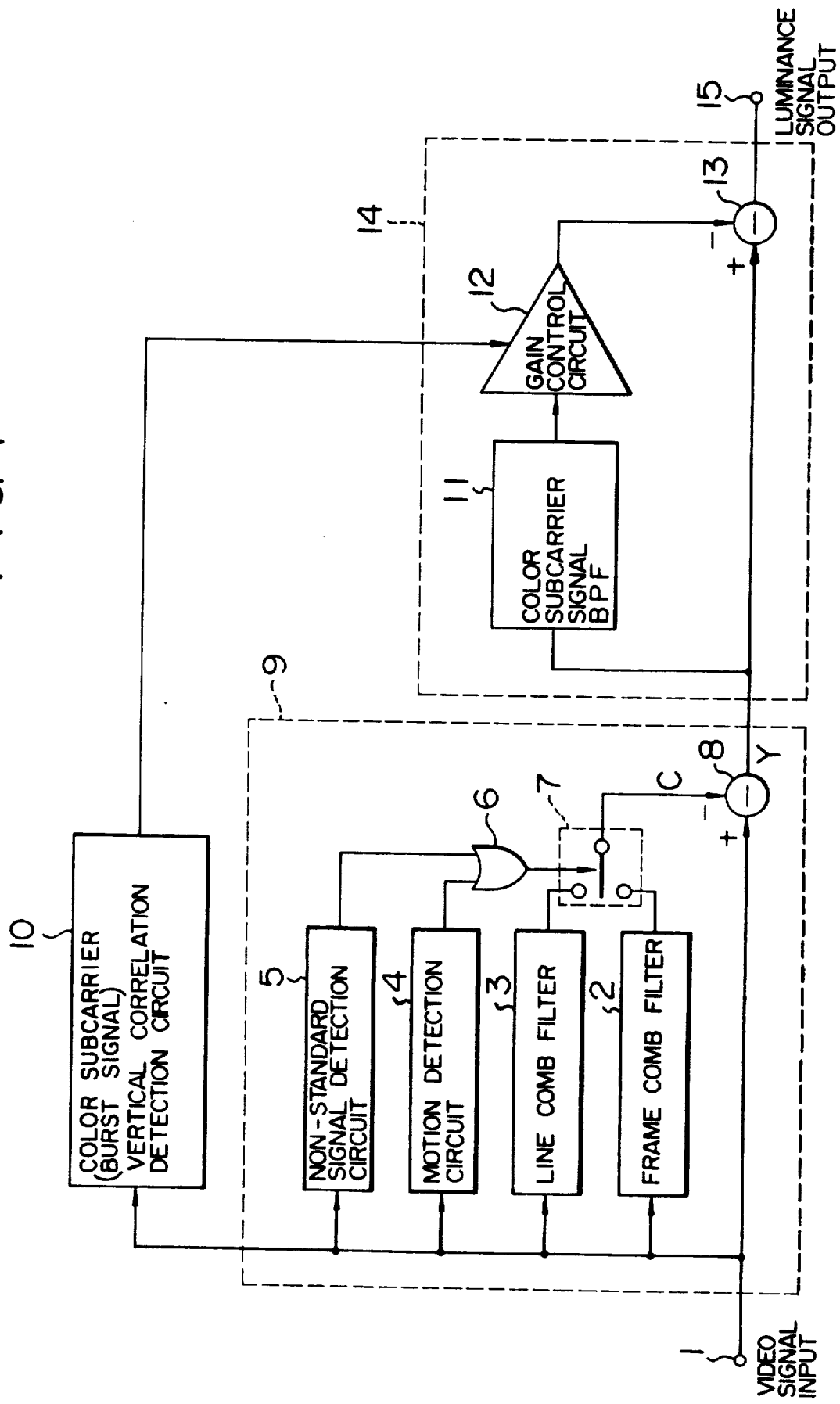
FIG. 1 is a block diagram showing the configuration of a dot crawling interference elimination device according to one embodiment of the present invention.

FIG. 1 is a block diagram of the dot crawling interference elimination device of one embodiment of the present invention.

In FIG. 1, 1 designates an input terminal, 2 a frame comb filter, 3 a line comb filter, 4 a motion detection circuit, 5 a non-standard signal detection circuit which utilizes inter-frame correlation of a color subcarrier, 6 an OR circuit, 7 a circuit for changing-over the line comb filter and the frame comb filter, 8 an attenuator, 9 an adaptive three-dimensional Y/C separation circuit, 10 a vertical correlation detection circuit for a color subcarrier, 11 a band pass filter for extracting a color subcarrier band from a luminance signal component, 12 a gain control circuit for controlling an output of the band pass filter 11 in accordance with an output of the color subcarrier vertical correlation detection circuit 10, 13 a substractor, 14 an adaptive notch filter, and 15 an output terminal.

Figure 2:
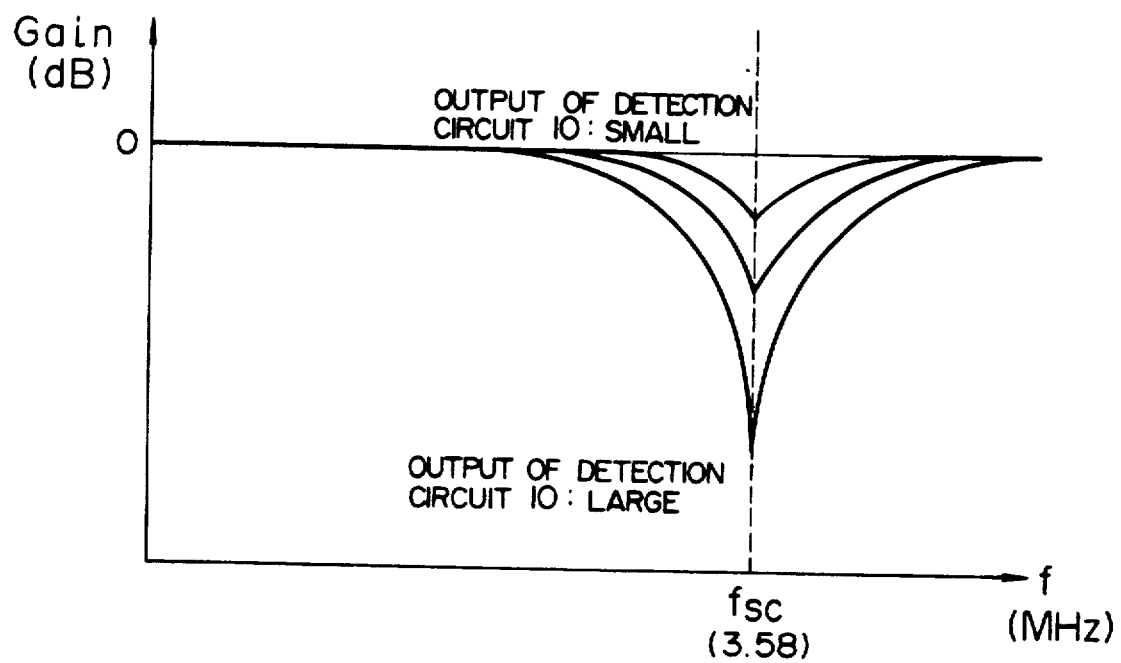
FIG. 2 is a characteristic diagram showing one example of frequency characteristics of an adaptive notch filter in FIG. 1.

In the above configuration, a video signal supplied to the input terminal 1 is supplied to the frame comb filter 2, the line comb filter 3, the motion detection circuit 4, the non-standard detection circuit 5 and the color sub-carrier vertical correlation detection circuit 10, respectively. The motion detection circuit 4 produces an output of "1" when the input video signal is of motion picture and an output of "0" when the input video signal is of still image, and applies the signal to the OR circuit 6. The non-standard signal detection circuit 5 detects a non-standard state of an input video signal in which a color sub-carrier wave frequency and a vertical scanning frequency do not have a normal relation, and produces output signals of "1" and "0" when the signal is of the non-standard state and of the standard state, respectively. The signal is applied to the OR circuit 6. An output of the OR circuit 6 controls the change-over circuit 7. In other words, when an input video signal is of a moving picture or a input video signal is a non-standard signal, the change-over circuit 7 selects the line comb filter 3, and the subtractor 8 produces a luminance signal which has been Y/C separated by the line comb filter. When an input video signal is of still picture and standard signal, the frame comb filter 2 is selected to carry out a Y/C separation. A luminance signal outputted from the subtractor 8 passes through the color sub-carrier band pass filter 11, and the output thereof is adjusted by the gain control circuit 12. By the subtractor 13, output of the circuit 12 is subtracted from the luminance signal of the level before it passes the band pass filter 11, so that a dot component which is a color signal component in the luminance signal component is suppressed. A resultant output is produced from the output terminal 15. In this case, the attenuation quantity of the color signal component in the luminance signal is determined by the gain control circuit 12 which is controlled by an output from the color subcarrier wave vertical correlation detection circuit 10. In other words, characteristics of the adaptive notch filter 14 which comprises the color subcarrier band pass filter 11, the gain control circuit 12 and the subtractor 13 change in accordance with the output of the color subcarrier vertical correlation detection circuit 10, as shown in FIG. 2. The color subcarrier vertical correlation detection circuit 10 detects inter-line correlation of a color burst signal of the input video signal, detects the non-standard state in which the color subcarrier and a horizontal scanning frequency do not have a predetermined relation, and produces an output having a value which corresponds to a degree of the non-standard state. In a non-standard state in which a color subcarrier and a horizontal scanning frequency do not have a predetermined relation, dot crawling interference occurs in a Y/C separation in the configuration using a line comb filter. To avoid this problem, gain of the above adaptive notch filter 14 is adjusted in accordance with a non-standard state so that a luminance signal which is optimum as a whole by having eliminated the dot interferences is produced at the output terminal 15.

Figure 3:
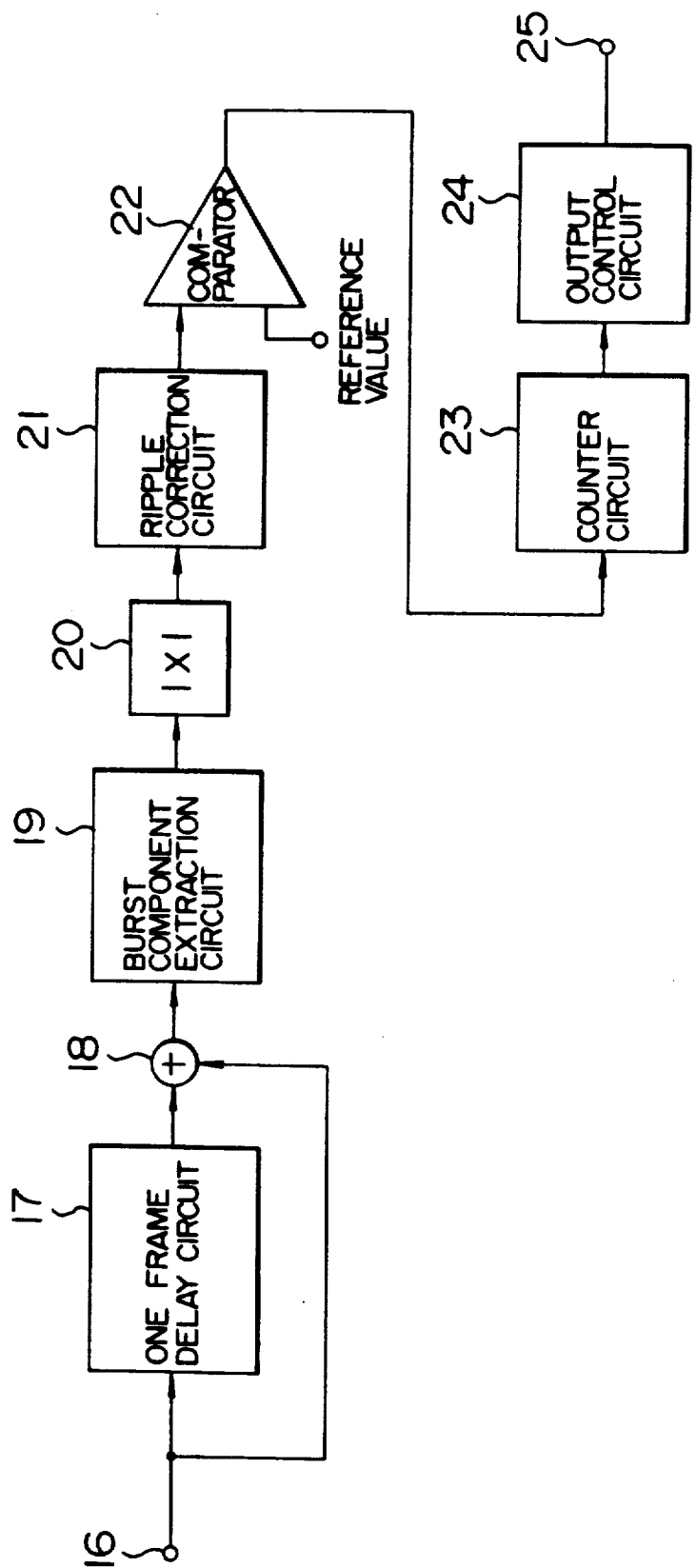
FIG. 3 is a block diagram showing one example of the configuration of a non-standard signal detection circuit in FIG. 1.

FIG. 3 is a block diagram showing one embodiment of the non-standard signal detection circuit 5. In FIG. 3, 16 designates an input terminal, 17 a one frame delay memory, 18 an adder, 19 a burst component extraction circuit comprising a band pas filter of the color subcarrier band and a latch circuit of a burst portion, 20 an absolute value circuit, 21 a ripple correction circuit for selectively outputting a maximum value of adjacent three picture elements, 22 a comparator for comparing an input signal with a predetermined reference value and outputting "1" signal when the input signal exceeds the reference value, 23 a counter circuit for counting a result of the comparison within a predetermined period, 24 an output control circuit for determining a final output of the non-standard signal detection circuit based on a result of the counting, and 25 an output terminal.

Operation of the circuits in FIG. 3 will be described below with reference to the waveform diagram in FIGS. 4-1 and 4-2. As shown in (a) and (c) of FIG. 4-1, when a color burst signal of a video signal applied to the input terminal 16 is reversed in phase between a frame and the next frame, an output of the adder 18, which is a result of the addition of the input signal and a signal which has passed through the one frame delay memory 17, becomes "0" at the burst signal portion ((e) of FIG. 4-1), and remains "0" after passing through the absolute value circuit 20, the ripple correction circuit 21 and the comparator 22 ((g) to (k) of FIG. 4-1). This state remains unchanged after passing through the counter circuit 23 and the output control circuit 24, and an output from the output terminal 25 is also "0" signal. In this case, the input video signal is discriminated to be of a standard state in which the color burst signal is accurately reversed in phase between a frame and the next frame. On the other hand, when a color burst signal of a video signal applied to the input terminal 16 is not reversed in phase but is in phase in every one frame such as shown in (b) and (d) of FIG. 4-2, for example, an output of the absolute value circuit 20 which is a signal of the absolute value of the burst portion extracted by the burst signal component extraction circuit 19 from the sum of the input signal and a signal that has passed through the one frame delay memory 17 ((f) of FIG. 4-2) takes a form as shown in (h) of FIG. 4-2. Further, the output passes through the ripple correction circuit 21 to have a ripple component eliminated ((j) of FIG. 4-2) and the result thereof is compared with a reference value in the comparator 22. As a result, "1" signal is produced as an output as shown in (i) of FIG. 4-2. Accordingly, the result of the comparison is counted by the counter circuit 23 within a predetermined period of time, and a counted value is further compared with a given reference value in the output control circuit 24. When the counted value exceeds the reference value, a result of the decision of a non-standard state is produced from the output terminal 25.

Although the above embodiment shows a case where the phases of a color burst signal are the same between the frames, it is of course possible to detect a non standard state in a similar manner in the case where the color burst signal assumes an optional phase difference between frames. Further, although one frame is assumed for the capacity of the delay memory in the above embodiment, it is of course possible to assume an integer number of frames for the capacity of the delay memory so long as it causes the signal combination of such a phase-reversed signal of a color subcarrier wave in accordance with the standard of an image signal.

FIG. 5 is a block diagram showing one embodiment of the color subcarrier wave vertical correlation detection circuit 10. In FIG. 5, 26 designates an input terminal, 27 a color burst signal inter-line correlation detection circuit for detecting inter-line correlation of a color burst signal of an input video signal, 28 a non-standard state discrimination circuit for judging or discriminating on the basis of the output of the detection means a non-standard state in which a color subcarrier and a horizontal scanning frequency of an input video signal are not in a predetermined relation, and 29 an output terminal.

FIG. 6 is a block diagram showing one embodiment of the color burst signal inter-line correlation detection circuit 27 in FIG. 5. In FIG. 6, 30 designates an input terminal, 31 a line delay memory, 32 an adder, 33 a burst component extraction circuit, 34 an absolute value circuit, 35 a ripple correction circuit, and 36 an output terminal.

Operation of the circuits in FIG. 6 will be explained below with reference to the waveform diagram in FIG. 7. As show in (a) and (c) of FIG. 7-1, when a color burst signal of a video signal applied to the input terminal 30 is reversed in phase between a line and the next line, an output of the adder 32, which is a result of the addition of the input signal and a signal which has passed through the one line delay memory 31, becomes "0" signal at the burst signal portion ((e) of FIG. 7-1), and remains "0" signal after passing through the absolute value circuit 34 and the ripple correction circuit 35 ((g) to (i) of FIG. 7-1). Accordingly, an output from the output terminal 36 also becomes "0" signal. In this case, the input video signal is discriminated to be in a standard state in which the color burst signal is accurately reversed in phase between a line and the next line. On the other hand, when the color burst signal of a video signal applied to the input terminal 30 is not reveersed in phase but is in phase in every one line such as shown in (b) and (d) of FIG. 7-2, for example, an output of the absolute value circuit 34 which is a signal of the absolute value of the burst portion extracted by the extraction circuit 33 from the sum of an input signal and a signal that has passed through the one line delay memory 31 ((f) of FIG. 7-2) takes a form as shown in (h) of FIG. 7-2. Further, the output passes through the ripple correction circuit 35 to have a ripple component eliminated, and a waveform as shown in (j) of FIG. 7-2 is produced as an output from the output terminal 36.

Although the above embodiment shows a case where the phases of a color burst signal are the same between the lines, it is of course possible to detect a non-standard state in a similar manner in the case where the phases are deviated with an optional phase difference between the lines. Further, although one line is assumed for the capacity of the delay memory in the above embodiment, it is of course possible to assume an integer number of lines for the capacity of the delay memory so long as it causes the combination of such a phase-reversed signal of a color subcarrier in accordance with the standard of an image signal FIG. 8 is a block diagram showing one embodiment of the non-standard state decision circuit 28 in FIG. 5. In FIG. 8, 37 designates an input terminal, 38 a comparator for comparing an input signal with a predetermined reference value and outputting "1" when the input signal exceeds the reference value, 39 a counter circuit for counting a result of the comparison within a predetermined period, 40 an integration circuit for integrating an input signal within a predetermined period, 41 an output control circuit for determining a final output of the non-standard decision circuit 27 based on outputs of the counter circuit 39 and the integration circuit 40, and 42 an output terminal.

In the above configuration, an inter-line correlation value of an input color burst signal is applied to the comparator 38, and a result of the comparison is applied to the counter circuit 39. The above correlation value is also applied to the integration circuit 40. Outputs of the counter circuit 39 and the integration circuit 40 are simultaneously applied to the output control circuit 41.

Operation of FIG. 8 will be explained below with reference to the waveform diagram in FIG. 9.

Figure 9:
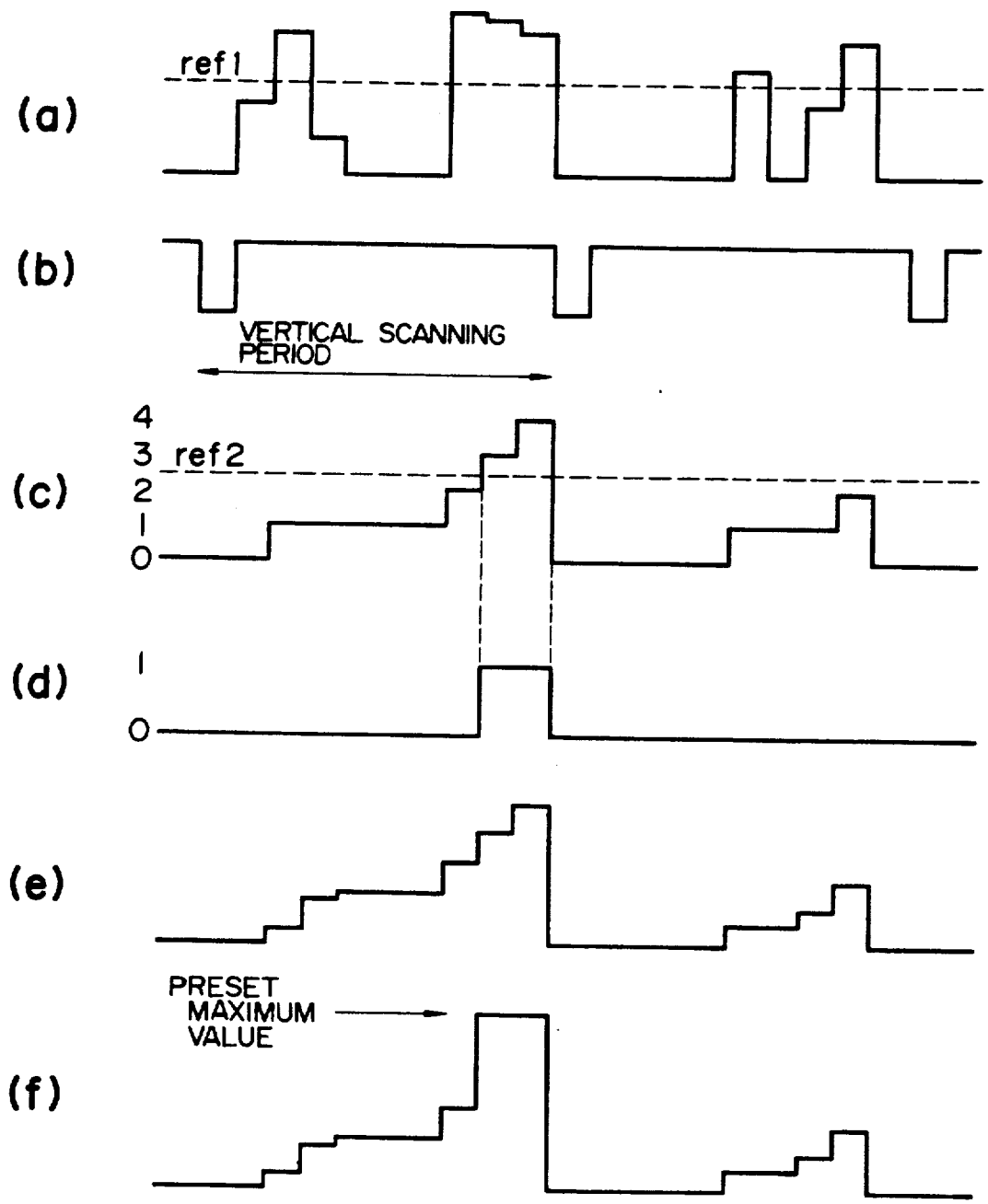
FIG. 9 is a waveform diagram for explaining the operation of the non-standard state discrimination circuit.

A signal which shows an inter-line correlation value of an input color burst signal ((a) of FIG. 9) is applied to the comparator 38 and is compared with a predetermined reference value ((a) ref. 1 of FIG. 9). When the input value exceeds the reference value, "1" is produced, and when the input value does not exceed the reference value, "0" is produced. These values are applied to the counter circuit 39. The counter circuit 39 counts the number of occurrence of "1" during one vertical scanning period ((b) of FIG. 9). An output of the counter circuit ((c) of FIG. 9) is applied to the output control circuit 41. This route detects mainly peak characteristics of a color burst signal inter-line correlation value.

A signal which shows an inter-line correlation value of an input color burst signal is also applied to the integration circuit 40. In the integration circuit 40, input signals are sequentially added in one vertical scanning period and the summation is produced as an output. An output of the integration circuit ((e) of FIG. 9) is applied to the output control circuit 41 in a similar manner as an output of the counter circuit is applied. This route detects mainly constant characteristics of a color burst signal inter-line correlation value.

Figure 10:
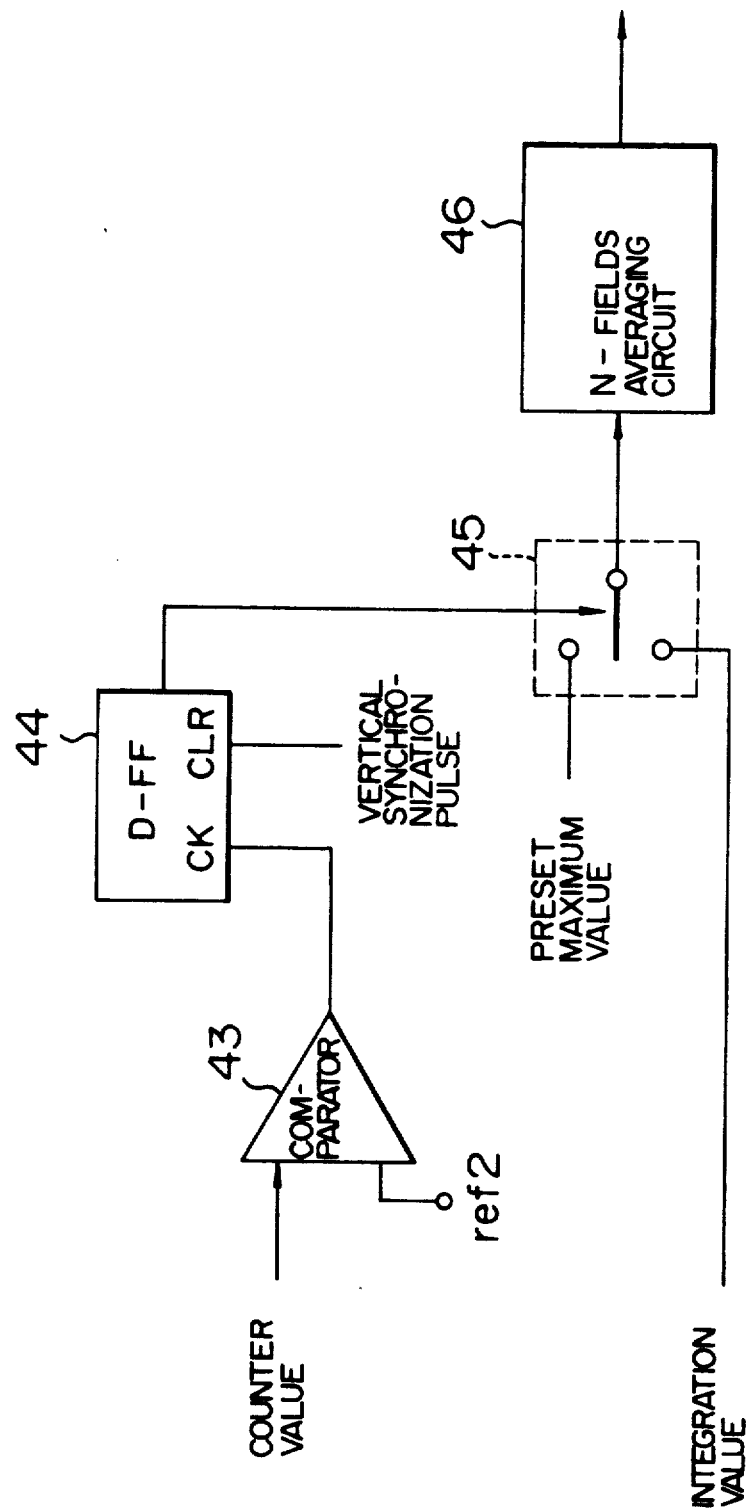
FIG. 10 is a block diagram showing one example of the configuration of an output control circuit in FIG. 8.
Figure 11:
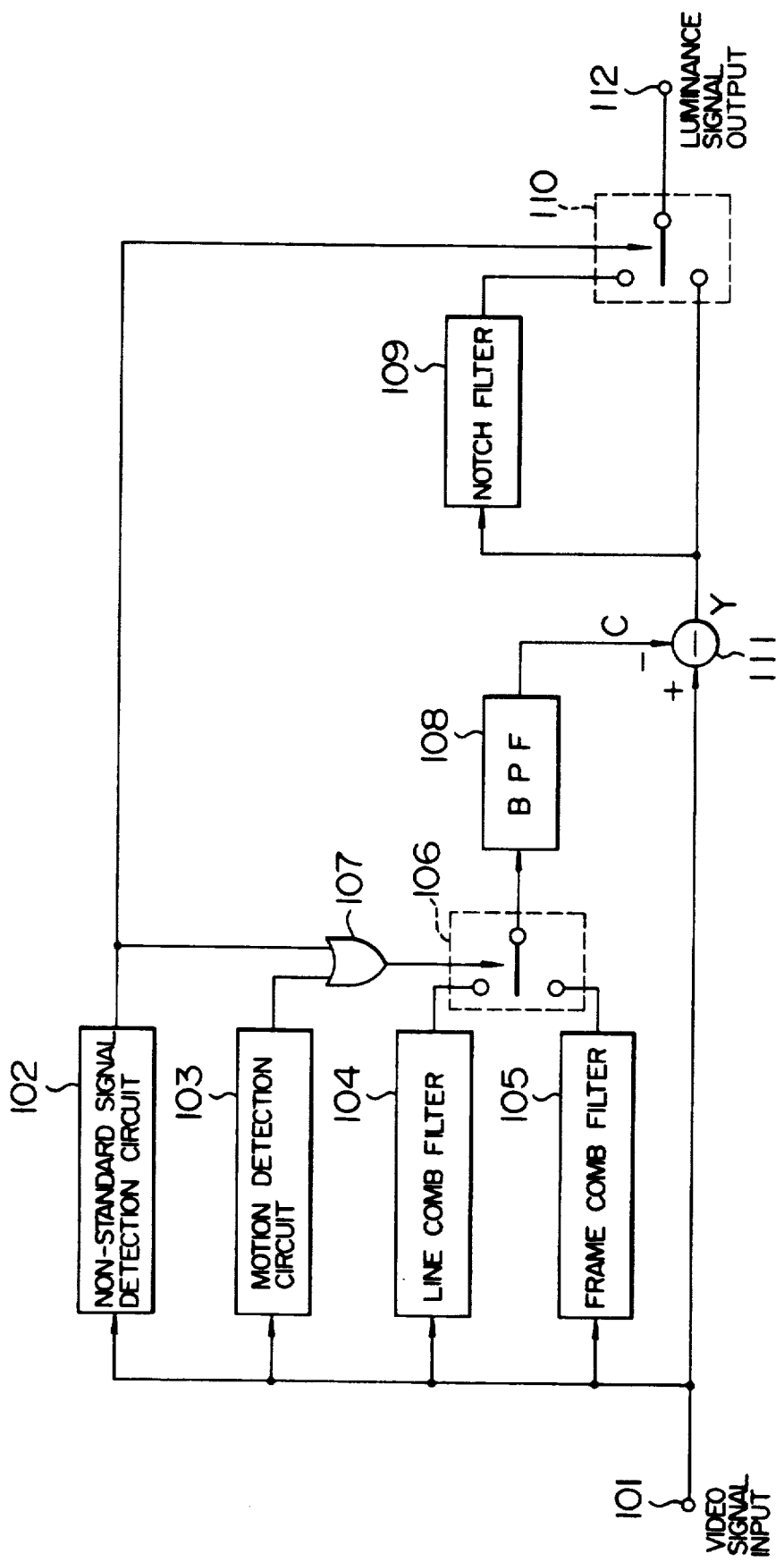
FIG. 11 is a block diagram showing the configuration of the conventional dot crawling interference elimination device.

The output control circuit 41 comprises a comparator 43, a D-flip-flop 44, a change-over circuit 45 and an N field average circuit 46, as shown in FIG. 10, for instance. In the output control circuit 41, when an input applied from the counter circuit 39 exceeds ref. 2 in the comparator 43, an output from the comparator 43 becomes "1" ((d) of FIG. 9). In this case, the change-over circuit 45 produces a preset maximum value. In other cases, the change-over circuit 45 produces an input from the integration circuit as it is. An output of the change-over circuit 45 ((f) of FIG. 9) is averaged in an arbitrary field (N fields) period, and the result is produced.

As described above, the color subcarrier vertical correlation detection unit in the present embodiment comprises means for detecting peak characteristics of a line correlation value of a color burst signal and means for integrating a constantly produced inter-line correlation value of color burst signal even if it is a small value, and the unit discriminates a non-standard state based on the result of these two means, so that a non-standard state decision output having a high precision is obtained from the output terminal 42.

Although the above-described embodiment assumes a non-standard decision circuit which includes both means for detecting peak characteristics of a line correlation value of a burst signal and means for detecting constant characteristics, it is of course effective to assume a non-standard decision circuit which uses only one of the two means.

We claim:

1. A dot crawling interference elimination device comprising:
   means for detecting vertical correlation of a color subcarrier of an input video signal;
   Y/C separation means for separating a luminance signal and a color signal from said input video signal in accordance with image motion and a non-standard state of said video signal; and
   an adaptive notch filter for attenuating gains of a color signal component in a luminance signal component separated by said Y/C separation means, in accordance with an output of said means for detecting vertical correlation,
   wherein said means for detecting vertical correlation of a color subcarrier detects a vertical correlation of a color subcarrier of said input video signal and provides an output signal representing said vertical correlation to an input terminal of said adaptive notch filter to control said adaptive notch filter.

2. A dot crawling interference elimination device according to claim 1, wherein said adaptive notch filter comprises: a band pass filter for extracting a color subcarrier band from a luminance signal component separated from said Y/C separation means; gain control means for varying a gain of an output from said band pass filter in accordance with a value of an external control signal; and a subtractor for subtracting an output from said gain control means and a luminance signal component.

3. A dot crawling interference elimination device according to claim 1, wherein said Y/C separation means comprises: means for detecting image motion of said input video signal; means for detecting non-standard characteristics on the basis of a frame correlation of a color subcarrier of said video signal; a line comb filter; a frame comb filter; and change-over means for changing over between said line comb filter and said frame comb filter in accordance with a detected output from said motion detection means or, said non-standard detection means.

4. A dot crawling interference elimination device comprising:
   means for detecting vertical correlation of a color subcarrier of an input video signal;
   Y/C separation means for separating a luminance signal and a color signal from said input video signal in accordance with image motion and a non-standard state of said video signal; and
   an adaptive notch filter for attenuating gains of a color signal component in a luminance signal component separated by said Y/C separation means, in accordance with an output of said means for detecting vertical correlation,
   said Y/C separation means comprising: means for detecting image motion of said video signal; means for detecting non-standard characteristics on the basis of a frame correlation of a color subcarrier of said video signal; a line comb filter; a frame comb filter; and change-over means for changing over between said line comb filter and said frame comb filter in accordance with a detected output from said motion detection means or said non-standard detection means, and said non-standard detection means including: arithmetic means for making a sum of color burst signals from an input video signal between frames; detection means for detecting an amplitude of a color burst signal portion from an output of said arithmetic means and detecting a frame correlation of the color burst signal; comparator means for comparing an output of said detection means with a predetermined reference value; counter means for counting a number of times when said frame correlation value becomes higher than said reference value within a predetermined period; and output control means for controlling an output on the basis of the value of an output from said counter means.

5. A color subcarrier correlation detection device, comprising:

color burst signal line correlation detection means for detecting a correlation of a color burst signal of an input video signal between lines; and non-standard state decision means for discriminating a non-standard state in which a color subcarrier and a horizontal scanning frequency are not in a predetermined relationship, based on said detection means, said non-standard state decision means including:

comparison means for comparing a line correlation value detected by said detection means with a predetermined reference value;

counter means for counting a number of times when said line correlation value becomes equal to or higher than said reference value, within a predetermined period; and output control means for controlling an output on the basis of the value of an output from said counter means.

6. A color subcarrier vertical correlation detection device comprising:

color burst signal line correlation detection means for detecting a correlation of a color burst signal of an input video signal between lines; and non-standard state decision means for discriminating a non-standard state in which a color subcarrier and a horizontal scanning frequency are not in a predetermined relationship, based on said detection means, said non-standard state decision means including:

integration means for integrating a line correlation value of the input color burst signal within a vertical scanning period; and output control means for controlling an output on the basis of the value of an output of said integration means.

7. A color subcarrier vertical correlation detection device comprising:

color burst signal line correlation detection means for detecting a correlation of a color burst signal of an input video signal between lines; and non-standard state decision means for discriminating a non-standard state in which a color subcarrier and a horizontal scanning frequency are not in a predetermined relationship, based on said detection means, said non-standard state decision means including:

comparison means for comparing a line correlation value of the input color burst signal with a predetermined reference value;

counter means for counting a number of times when said line correlation value becomes higher than said reference value, within a predetermined period;

integration means for integrating a line correlation value of the input color burst signal within a vertical scanning period; and an output control means for controlling an output on the basis of a value which is a result of mixing of an output value of said counter means and an output value of said integration means.

* * * * *